US012087537B2

(12) United States Patent
Schuster et al.

(10) Patent No.: US 12,087,537 B2
(45) Date of Patent: Sep. 10, 2024

(54) ON-LOAD TAP CHANGER

(71) Applicant: Maschinenfabrik Reinhausen GmbH, Regensburg (DE)

(72) Inventors: Thomas Schuster, Regensburg (DE); Andreas Raith, Deggendorf (DE); Georg Kellendorfer, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 163 days.

(21) Appl. No.: 17/775,317

(22) PCT Filed: Sep. 17, 2020

(86) PCT No.: PCT/EP2020/075967

§ 371 (c)(1),
(2) Date: May 9, 2022

(87) PCT Pub. No.: WO2021/094015

PCT Pub. Date: May 20, 2021

(65) Prior Publication Data

US 2022/0406534 A1 Dec. 22, 2022

(30) Foreign Application Priority Data

Nov. 12, 2019 (DE) ..................... 10 2019 130 457.1

(51) Int. Cl.
*H01H 9/00* (2006.01)

(52) U.S. Cl.
CPC ........ *H01H 9/0011* (2013.01); *H01H 9/0038* (2013.01); *H01H 2009/0094* (2013.01)

(58) Field of Classification Search
CPC .. H01H 9/0027; H01H 9/0005; H01H 9/0016; H01H 9/0038; H01H 2009/0061;
(Continued)

(56) References Cited

U.S. PATENT DOCUMENTS

| | | | |
|---|---|---|---|
| 3,421,073 | A | 1/1969 | Perkins |
| 2013/0213776 | A1 | 8/2013 | Hoepfl et al. |

(Continued)

FOREIGN PATENT DOCUMENTS

| | | | |
|---|---|---|---|
| DE | 538304 | C | 11/1931 |
| DE | 675083 | C | 5/1939 |

(Continued)

*Primary Examiner* — Ahmed M Saeed
(74) *Attorney, Agent, or Firm* — LEYDIG, VOIT & MAYER, LTD.

(57) ABSTRACT

An on-load tap changer uninterruptedly switches between winding taps of a tap-changing transformer. The on-load tap changer includes: at least one selector configured to preselect, in a powerless manner, a selected winding tap of the winding taps; at least one diverter switch configured to actually switch loads from a previous winding tap to a preselected winding tap of the winding taps; at least one toothed gearing comprising a first gearwheel and a second gearwheel, the first gearwheel being assigned to the selector, and the second gearwheel being assigned to the diverter switch; and a drive shaft, which is configured to be actuated by a motor drive. The first gearwheel and the second gearwheel are directly interconnected mechanically in such a way that the first gearwheel and the second gearwheel are simultaneously actuatable. The drive shaft is configured to drive either the first gearwheel or the second gearwheel.

12 Claims, 6 Drawing Sheets

(58) Field of Classification Search
CPC ...... H01H 9/0033; H01H 3/44; H01H 9/0011; H01H 9/0044
See application file for complete search history.

(56) References Cited

U.S. PATENT DOCUMENTS

| | | | | |
|---|---|---|---|---|
| 2013/0341166 | A1* | 12/2013 | Albrecht | H01H 3/44 200/11 TC |
| 2015/0068877 | A1* | 3/2015 | Hoepfl | H01H 9/0027 200/11 TC |
| 2015/0170847 | A1* | 6/2015 | Wrede | H01H 3/3042 200/11 TC |

FOREIGN PATENT DOCUMENTS

| | | | |
|---|---|---|---|
| DE | 923978 | C | 2/1955 |
| DE | 1902245 | B2 | 1/1972 |
| DE | 1902245 | C3 | 8/1972 |
| DE | 102010007535 | A1 | 8/2011 |
| GB | 1114868 | A | 5/1968 |
| WO | WO 2012135213 | A1 | 10/2012 |

* cited by examiner

ON-LOAD TAP CHANGER

CROSS REFERENCE TO RELATED APPLICATIONS

This application is a U.S. National Phase application under 35 U.S.C. § 371 of International Application No. PCT/EP2020/075967, filed on Sep. 17, 2020, and claims benefit to German Patent Application No. DE 10 2019 130 457.1, filed on Nov. 12, 2019. The International Application was published in German on May 20, 2021 as WO 2021/094015 A1 under PCT Article 21(2).

FIELD

The present disclosure relates to an on-load tap changer for uninterrupted diverter switch operation between different winding taps of a tap-changing transformer.

BACKGROUND

On-load tap changers conventionally consist of a selector for preselecting, in a powerless manner, the respective winding tap of the transformer which is to be switched to, and an on-load tap changer for actually switching loads from the previous winding tap to the new, preselected winding tap. The switching takes place by means of mechanical actuation of different switches and contacts of the selector and of the diverter switch, which is initiated by a motor drive and a drive shaft. Furthermore, the on-load tap changer, together with the motor drive and the control cabinet in which the motor control is located, may be mounted on the transformer housing from the outside (what is known as a “bolt-on tap changer”).

Document GB 1 114 868 A discloses a three-phase on-load tap changer in a container, which is attached to the side of the wall of an oil-fired boiler of a transformer. The on-load tap changer comprises a selector that preselects the winding taps of the transformer in a powerless manner by means of movable selector contacts, and a diverter switch having two vacuum switches by means of which the actual diverter switch operation is carried out. The individual switching and contact elements of the selector and of the diverter switch are actuated via a toothed gearing.

In the case of on-load tap changers in operation, for example as a result of a change in the requirements on the on-load tap changer, or after a decades-long operating life and accompanying signs of ageing of the on-load tap changer, it may be necessary to replace the on-load tap changer. When replacing an old on-load tap changer with a new one, in addition to the technical requirements on the on-load tap changer, the conditions at the operating site, in particular the conditions in terms of space, should also be taken into consideration, since there is generally only a limited or defined amount of space available for the on-load tap changer.

If a new transformer is equipped with an on-load tap changer, then generally, the on-load tap changer is firstly mounted on the transformer, and then the transformer is transported together with the on-load tap changer to the operation site or end users. The transportation takes place for example on a train car or in a truck, and therefore only a limited amount of space is available for the transformer including the on-load tap changer and the accompanying motor drive with a control cabinet.

SUMMARY

In an embodiment, the present disclosure provides an on-load tap changer that uninterruptedly switches between winding taps of a tap-changing transformer. The on-load tap changer includes: at least one selector configured to preselect, in a powerless manner, a selected winding tap of the winding taps; at least one diverter switch configured to actually switch loads from a previous winding tap to a preselected winding tap of the winding taps; at least one toothed gearing comprising a first gearwheel and a second gearwheel, the first gearwheel being assigned to the selector, and the second gearwheel being assigned to the diverter switch; and a drive shaft, which is configured to be actuated by a motor drive. The first gearwheel and the second gearwheel are directly interconnected mechanically in such a way that the first gearwheel and the second gearwheel are simultaneously actuatable. The drive shaft is configured to drive either the first gearwheel or the second gearwheel.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
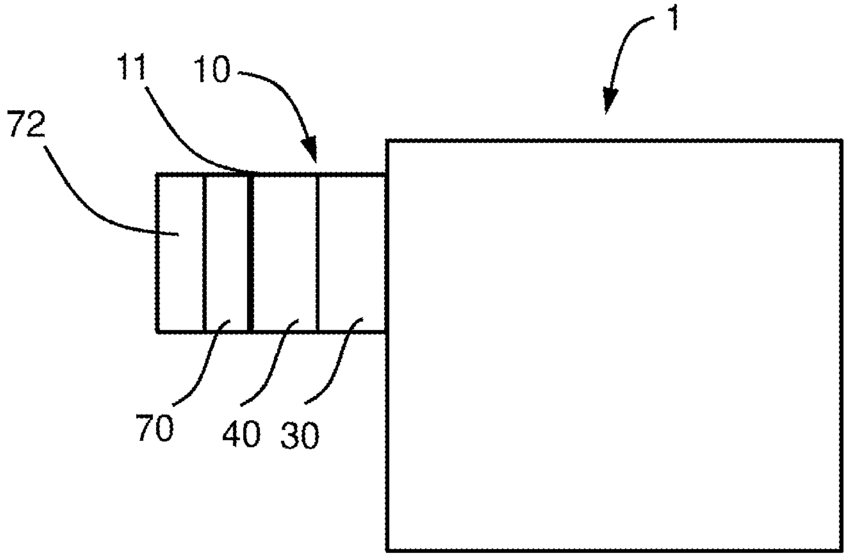
FIG. 1 shows a schematic construction of a tap-changing transformer with an exemplary embodiment of an on-load tap changer according to the prior art.

One or more aspects of the present disclosure provide an improved concept for an on-load tap changer, which can be mounted on the transformer in a space-efficient manner and in such a way that it can be adapted to the spatial conditions on site.

The on-load tap changer according to an aspect of the present disclosure comprises an on-load tap changer for uninterrupted switching between winding taps of a tap-changing transformer. The on-load tap changer comprises at least one selector unit for preselecting, in a powerless manner, a selected winding tap, at least one toothed gearing having a first gearwheel and a second gearwheel, the first gearwheel being assigned to the selector unit, and the second gearwheel being assigned to the diverter switch unit, and a drive shaft which is actuated by a motor drive. In this case, the first gearwheel and the second gearwheel are directly interconnected mechanically, in such a way that the gearwheels can be actuated simultaneously. The drive shaft can drive either the first gearwheel or the second gearwheel. Therefore either the first gearwheel is the driving wheel and the second gearwheel is the driven wheel, or vice versa. By means of the direct, mechanical coupling of the gearwheels, the selector unit and the diverter switch unit are actuated equally and centrally by the drive shaft. Directly means specifically without an intermediate member between the gearwheels.

The transmission ratio of the toothed gearing is preferably i=1. All types of motors are conceivable as a motor drive, e.g. motors operated with direct current, motors operated with alternating current, regulated and unregulated motor systems etc.

The improved concept has the advantage that, by means of the design of the on-load tap changer and in particular of the transmission which transmits the drive movement of the drive shaft equally to the actuation means of the selector and of the diverter switch, the drive shaft and the motor drive can be arranged in a variable manner. This makes it possible to react in a flexible manner to the limited space availability when transporting the transformer to the operation site, or to the spatial conditions at the operation site, for example a substation or a gas-insulated switchgear.

According to one possible embodiment, the at least one selector unit, the at least one diverter switch unit, the at least one toothed gearing and the drive shaft are arranged in a housing of the on-load tap changer. The housing is preferably sealed off from the outside.

According to one possible embodiment, the first gearwheel is mounted in a rotationally fixed manner on a first gear shaft, and the second gearwheel is mounted in a rotationally fixed manner on a second gear shaft.

According to one possible embodiment, the first gearwheel and the first gear shaft are formed as a single piece, and the second gearwheel and the second gear shaft are formed as a single piece.

According to one possible embodiment, the first gear shaft is rotatable about a first gear axis, and the second gear shaft is rotatable about a second gear axis, and the first and second gear axes intersect at a defined angle. Preferably, the first and second gear axes intersect at an angle of 90 degrees.

According to one possible embodiment, the first gearwheel and the second gearwheel are each in the form of a bevel gearwheel.

According to one possible embodiment, the bevel gearwheels are formed in the basic shape of a truncated cone having a toothed lateral surface. The toothing can be in the form of straight or helical teeth. According to one possible embodiment, the first and the second bevel gearwheels slot together at the tips of the toothing.

According to one possible embodiment, the first and the second gearwheels have an identical design.

According to one possible embodiment, the drive shaft can be connected in a rotationally fixed manner either to the first gear shaft or to the second gear shaft via a coupling. The coupling is preferably in the form of a coupling having a plurality of coupling shells.

According to one possible embodiment, the drive shaft is arranged on the first gear axis and/or in the extension of the first gear shaft when driving the first gearwheel, and on the second gear axis and/or in the extension of the second gear shaft when driving the second gearwheel.

According to one possible embodiment, the motor drive is fixed to the housing of the on-load tap changer by means of a transmission module. It can be provided that the transmission module is also in the form of a sealing module and seals off the interior of the housing of the on-load tap changer from the outside.

According to one possible embodiment, the on-load tap changer further comprises a control cabinet in which at least the control of the motor drive is arranged, and which is formed separately, i.e. physically separated from the motor drive. The control cabinet is preferably connected to the motor drive by means of a cable.

According to one possible embodiment, the control cabinet is fixed to a housing of the tap-changing transformer and/or to the housing of the on-load tap changer and/or to a suitable fixing means. The suitable fixing means can be for example a wall at the operation site of the tap-changing transformer.

According to one possible embodiment, the on-load tap changer is in the form of a three-phase on-load tap changer and comprises one selector unit, one diverter switch unit, one drive shaft and one toothed gearing per phase, that is to say three selector units, three diverter switch units, three drive shafts and three toothed gearings in total.

According to one possible embodiment, the on-load tap changer accordingly comprises a first, a second and a third selector unit, a first, a second and a third diverter switch unit, a first, a second and a third drive shaft, and a first, a second and a third toothed gearing. The first drive shaft actuates the first selector unit and the first diverter switch unit via the first toothed gearing. The second drive shaft actuates the second selector unit and the second diverter switch unit via the second toothed gearing. The third drive shaft actuates the third selector unit and the third diverter switch unit via the third toothed gearing.

According to one possible embodiment, the drive shafts are mechanically coupled to one another in such a way that the first drive shaft drives the second drive shaft via the first toothed gearing, and the second drive shaft drives the third drive shaft via the second toothed gearing.

According to one preferred embodiment, the toothed gearings are in the form of bevel gearings.

According to one possible embodiment, the second and third drive shafts are located on a common axis.

According to one possible embodiment, the first, second and third drive shafts are located on a common axis.

According to one possible embodiment, each phase of the on-load tap changer comprises a first gearwheel and a second gear wheel in each case, and a first gear shaft and a second gear shaft in each case.

According to one possible embodiment, at least one second gear shaft is arranged between two drive shafts.

According to one possible embodiment, the drive shafts and the second gear shafts are interconnected in a rotationally fixed manner via at least one coupling.

In the following, aspects of the present disclosure are explained in detail on the basis of exemplary embodiments with reference to the drawings. Components which are identical or functionally identical or which have an identical effect may be provided with identical reference signs. Identical components or components having an identical function may in some cases be explained only in relation to the drawing in which they first appear. The explanation is not necessarily repeated in the subsequent drawings.

FIG. 1 is a schematic view of a tap-changing transformer 1 with an exemplary embodiment of an on-load tap changer 10 which is in the form of a bolt-on tap changer. The on-load tap changer 10 comprises a selector 30 and a diverter switch 40 and is driven by a motor drive 70, the control of which is accommodated in a control cabinet 72. The on-load tap changer 10, the motor drive 70 and the control cabinet 72 are arranged in a housing 11.

Figure 2:
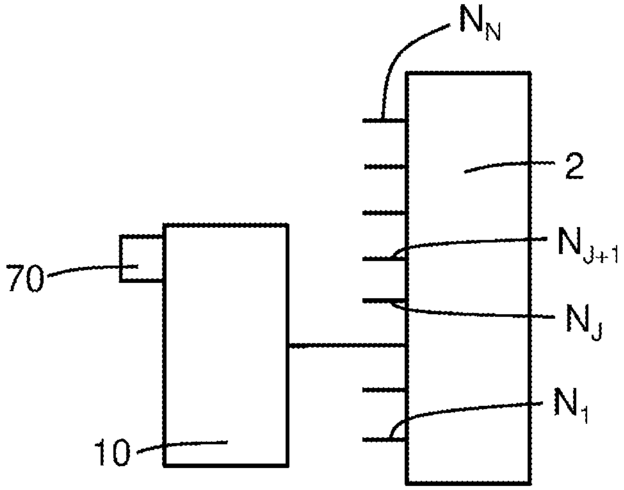
Prior Art Fig. 2
FIG. 2 is a schematic view of the winding taps of a tap-changing transformer.

FIG. 2 is a schematic view of a control winding 2 of the tap-changing transformer 1 (see FIG. 1) comprising different winding taps $N_1, \ldots, N_J, \ldots, N_N$. The winding taps $N_1, \ldots, N_J, \ldots, N_N$ are switched on and off by the on-load tap changer 10. The switching off and on can be implemented by any desired means such as by a selector 30, a diverter switch 40 etc. The on-load tap changer 10 is actuated via the motor drive 70.

Figure 3A:
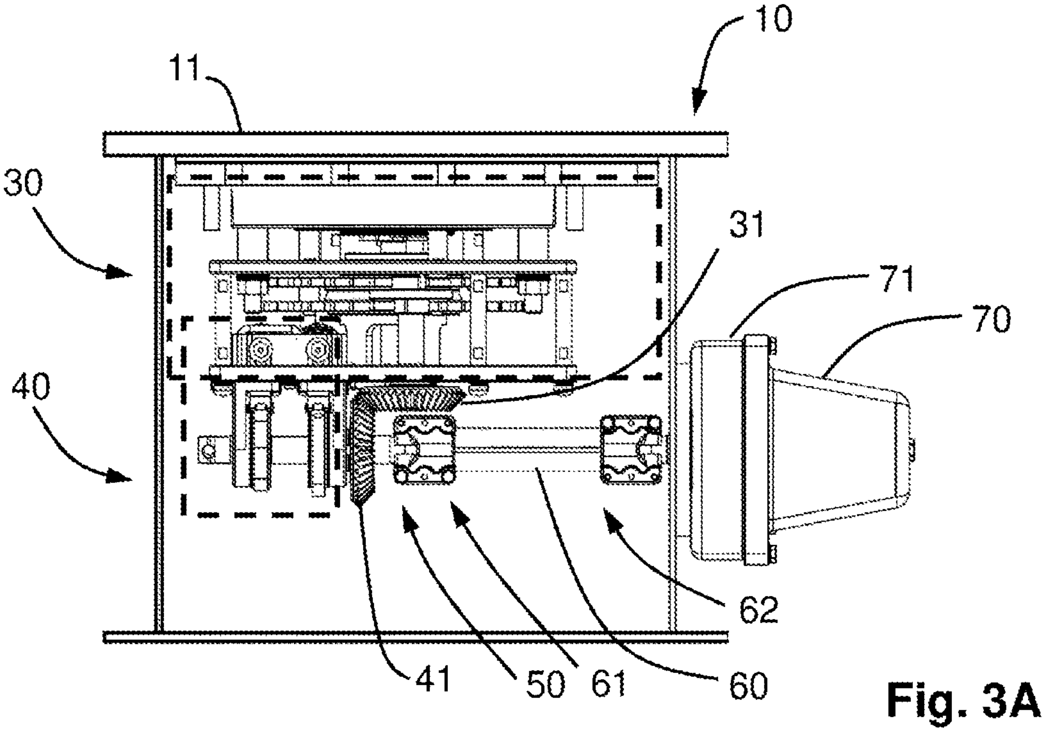
FIG. 3A is a plan view of an exemplary embodiment of a on-load tap changer according to the improved concept.

FIG. 3A shows an exemplary embodiment of an on-load tap changer 10 according to the improved concept of the present disclosure in the plan view. The on-load tap changer 10 comprises a housing 11, a selector unit 30 for preselecting, in a powerless manner, a selected winding tap $N_1, \ldots, N_J, \ldots, N_N$ of a control winding 2 of a tap-changing transformer 1 (see FIG. 2), a diverter switch unit 40, by which the actual diverter switch operation from the previous winding tap $N_J$ to the preselected winding tap $N_{J+1}$ of the control winding takes place, and a toothed gearing 50, which is in the form of a bevel gearing and comprises a first bevel gearwheel 31 and a second bevel gearwheel 41. The bevel gearwheels 31 and 41 are in the form of truncated cones having toothed lateral surfaces and are made of a metallic material, preferably steel. The teeth on the toothed lateral surface are interlocked with one another in such a way that the bevel gearwheels 31 and 41 are mechanically operatively connected to one another directly, that is to say without an intermediate member. The first bevel gearwheel 31 is assigned to the selector unit 30 and actuates this unit, and the second bevel gearwheel 41 is assigned to the diverter switch unit 40 and actuates this unit. The on-load tap changer 10 further comprises a drive shaft 60 which is connected at a first end 61 to the bevel gearing 50 and at a second end 62 to a motor drive 70. The drive shaft 60 is preferably made of insulating material. The motor drive 70 is fixed to the side of the housing 11, in a extension of the drive shaft 60, by means of a transmission module 71, in particular a sealing module, which seals off the interior of the housing 11 from the outside. According to this embodiment, the drive shaft 60 directly drives the bevel gearwheel 41, that is to say the diverter switch unit 40. As a result of the mechanical operative connection between the bevel gearwheel 31 and the bevel gearwheel 41, the rotational movement of the bevel gearwheel 41 is transmitted directly to the bevel gearwheel 31 so that the selector unit 30 and the diverter switch unit 40 are actuated equally.

Figure 3B:
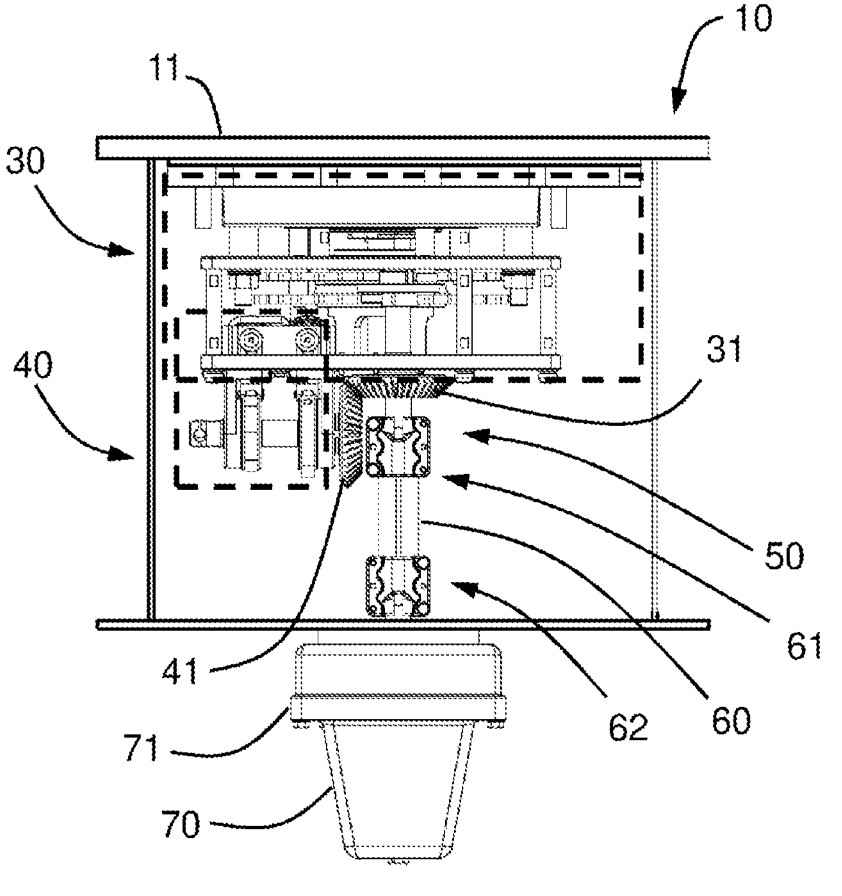
FIG. 3B is a plan view of another exemplary embodiment of an on-load tap changer according to the improved concept.

FIG. 3B shows another exemplary embodiment of an on-load tap changer 10 according to the improved concept in the plan view. According to this embodiment, the drive shaft 60 directly drives the bevel gearwheel 31, that is to say the selector unit 30. As a result of the mechanical operative connection between the bevel gearwheel 41 and the bevel gearwheel 31, the diverter switch unit 40 and the selector unit 30 are actuated equally. The motor drive 70 is fixed to the end face of the housing 11 in the extension of the drive shaft 60 by means of the transmission module 71.

Figure 4A:
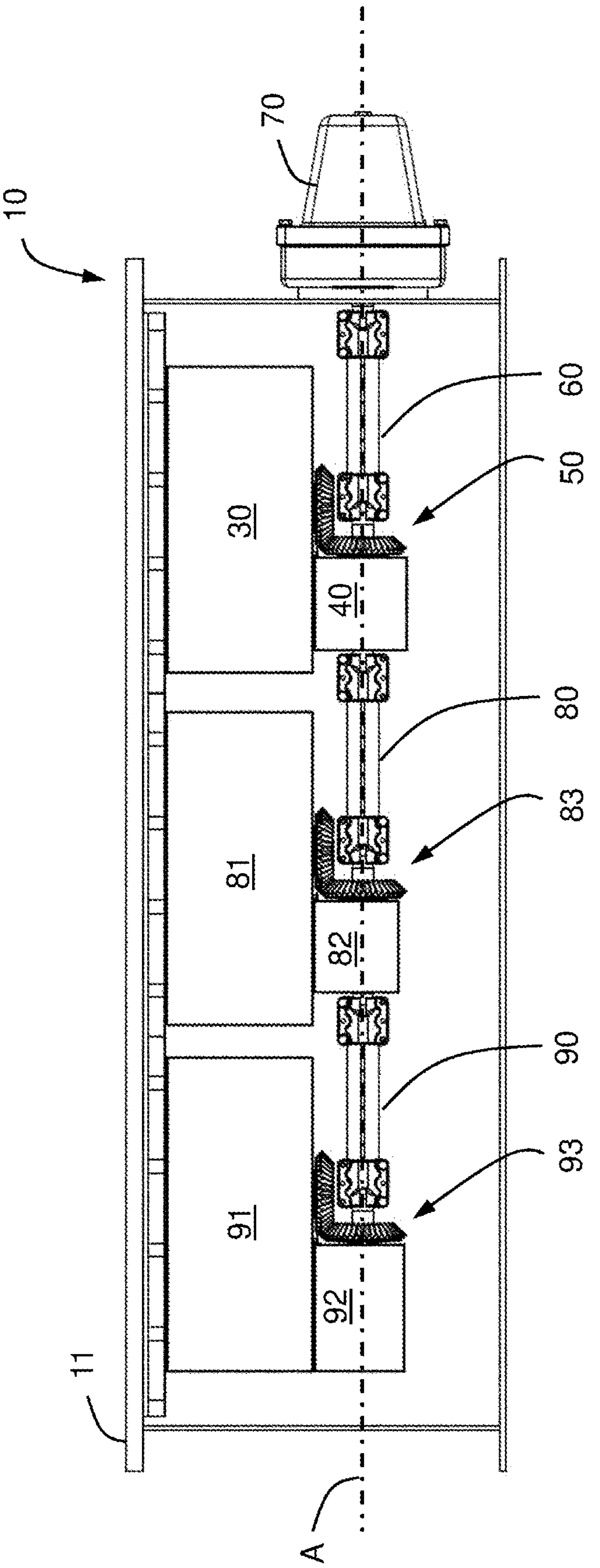
FIG. 4A is a plan view of another exemplary embodiment of an on-load tap changer according to the improved concept.

FIG. 4A shows another exemplary embodiment of an on-load tap changer 10 according to the improved concept in the plan view. By way of example, in this case, the on-load tap changer 10 is constructed as a three-phase on-load tap changer and therefore comprises three selector units 30, 81 and 91, three diverter switch units 40, 82 and 92, three drive shafts 60, 80 and 90, and three toothed gearings 50, 83 and 93 in total. The drive shaft 60 actuates the selector unit 30 and the diverter switch unit 40 via the toothed gearing 50, the drive shaft 80 actuates the selector unit 81 and the diverter switch unit 82 via the toothed gearing 83, and the drive shaft 90 actuates the selector unit 91 and the diverter switch unit 92 via the toothed gearing 93. The three phases, which can each be divided into a selector unit 30, 81, 91, a diverter switch unit 40, 82, 92, a drive shaft 60, 80, 90 and a toothed gearing 50, 83, 93, are all arranged in one housing 11. The drive shafts 60, 80, 90 are arranged on a common axis A and are mechanically coupled to one another in such a way that the first drive shaft 60 drives the second drive shaft 80 via the toothed gearing 50, and the second drive shaft 80 in turn drives the third drive shaft 90 via the second toothed gearing 83. The first drive shaft 60 is driven by the motor drive 70 which is arranged on the side of the housing 11 in the extension of the drive shaft 60. The drive shaft transmits the drive movement to the toothed gearing 50. Thus all three phases with the respective selector units 30, 81, 91 and the respective diverter switch units 40, 82, 92 are driven centrally via the drive shaft 60.

Figure 5A:
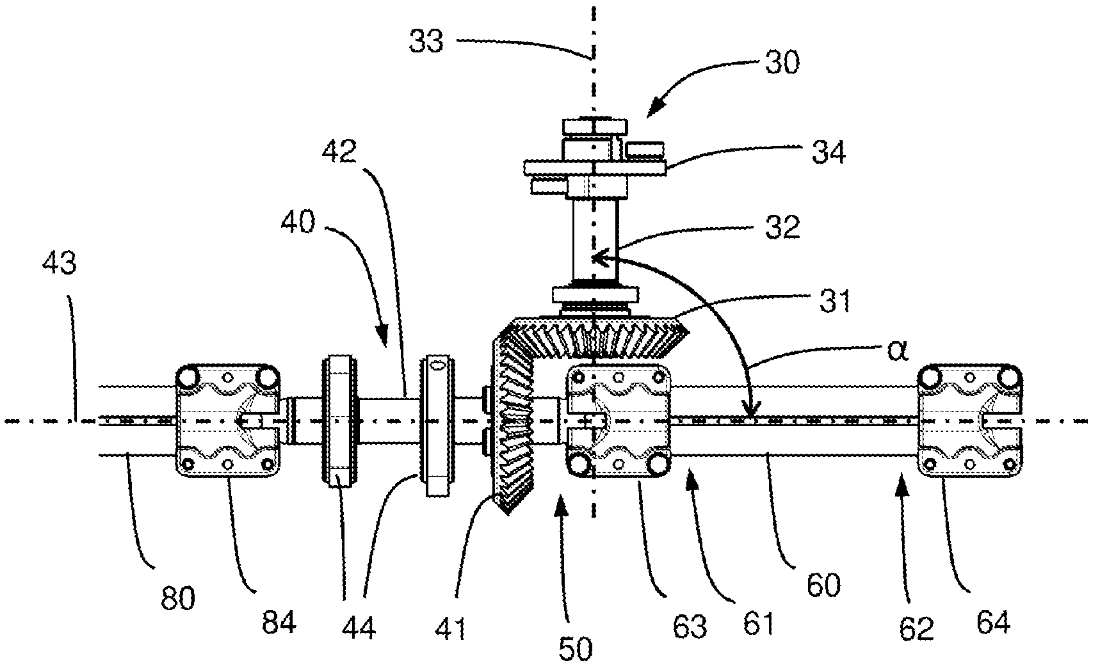
FIG. 5A is a detailed view of the on-load tap changer from FIGS. 3A and 4A.

FIG. 5A is a detailed view of the on-load tap changer 10 from FIGS. 3A and 4A, which shows the mechanical coupling between the first drive shaft 60 and the second drive shaft 80 via the bevel gearing 50. In the embodiment according to FIG. 4A, the coupling between the second drive shaft 80 and the third drive shaft 90 has an identical construction. The first bevel gearwheel 31 is arranged in a rotationally fixed manner on a first gear shaft 32, and the second bevel gearwheel 41 is arranged in a rotationally fixed manner on a second gear shaft 42. The gear shafts 32 and 42 preferably consist of a metallic material, e.g. steel. The first gear shaft 32 is mounted so as to be able to rotate about a gear axis 33, and the second gear shaft 42 is mounted so as to be able to rotate about a gear axis 43. The first gear axis 33 and the second gear axis 43 intersect in a plane at a defined angle α, which is preferably in the form of a right angle. The selector unit 30 comprises a driver 34 which is connected in a rotationally fixed manner to the first gear shaft 32 and actuates movable selector contacts which contact the winding taps $N_1, \ldots, N_J, \ldots, N_N$ of the control winding 2 of the tap-changing transformer 1 (see FIG. 2). The diverter switch unit 40 comprises actuation means 44 for switching elements, by which the actual diverter switch operation from one winding tap $N_J$ to the preselected winding tap $N_{J+1}$ of the control winding 2 (see FIG. 2) is carried out. The actuation means 44 are in the form of cam discs 44 which are connected in a rotationally fixed manner to the gear shaft 42 and during the rotation of which the switching elements are opened and closed, for example by means of a lever mechanism. The switching elements can preferably be in the form of vacuum switching tubes. For example one cam disc 44 is provided per vacuum switching tube. The drive shaft 60 is arranged on the second gear axis 43 in the extension of the second gear shaft 42 and is connected at the first end 61 in a rotationally fixed manner to the second gear shaft 42 via a coupling 63. The motor drive 70 is arranged at the second end 62 of the drive shaft 60 and drives the drive shaft 60 via a coupling 64. Within a 360 degree rotation of drive shaft 60 and gear shaft 42, an actuation of the diverter switch unit 40 and—as a result of the coupling of the bevel gearwheels 41 and 31—an actuation of the selector unit 30 is carried out. The transmission of movement between the drive shafts 60 and 80 takes place via the coupling 63, the second gear shaft 42 and via another coupling 84 which connects the drive shaft 80 to the second gear shaft 42 in a rotationally fixed manner. The couplings 62, 64 and 84 each preferably comprise two coupling shells. In principle, however, any type of shaft coupling can be used.

Figure 4B:
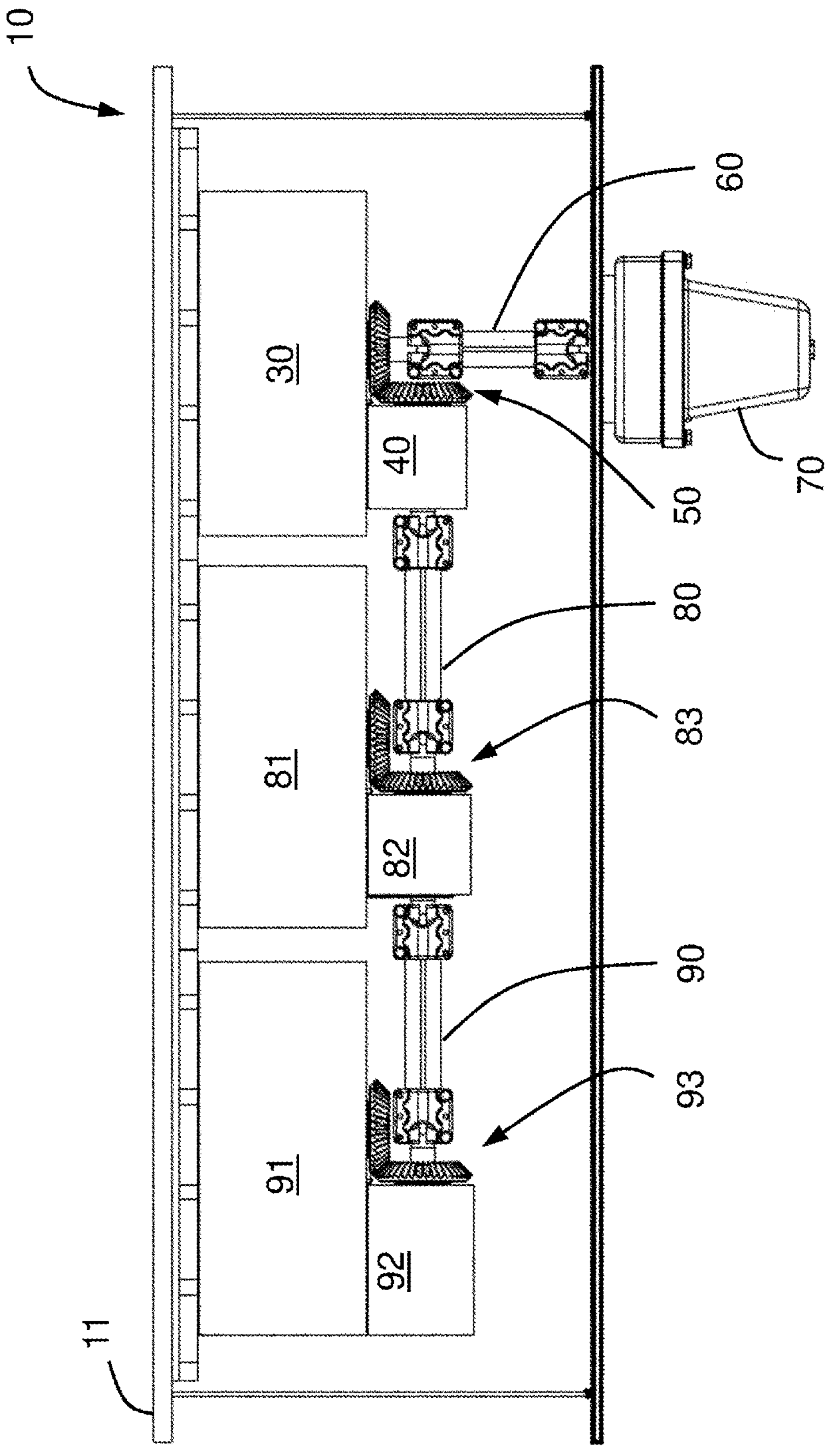
FIG. 4B is a plan view of another exemplary embodiment of a on-load tap changer according to the improved concept.

FIG. 4B shows another exemplary embodiment of an on-load tap changer 10 according to the improved concept in the plan view. This on-load tap changer 10 is also for example in the form of a three-phase switch. According to this embodiment, analogously to the embodiment shown in FIG. 3B, the motor drive 70 is arranged on the end face of the housing 11 in the extension of the drive shaft 60, that is to say that the drive shaft 60 directly drives the first gearwheel 31, as will be described in greater detail in the following with reference to the description of FIG. 5B. The coupling between the second drive shaft 80 and the third drive shaft 90 is formed analogously to the arrangement shown in FIG. 5A.

Figure 5B:
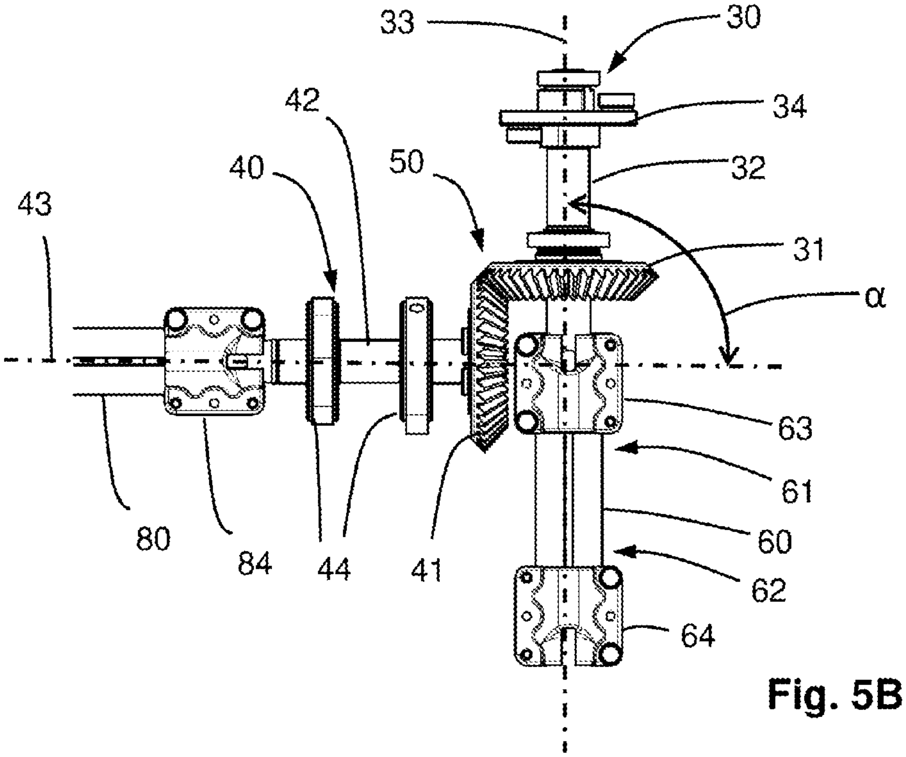
FIG. 5B is a detailed view of the on-load tap changer from FIGS. 3B and 4B.

FIG. 5B is a detailed view of the on-load tap changer 10 from FIGS. 3B and 4B. In this case, the drive shaft 60 is arranged on the first gear axis 33 in the extension of the first gear shaft 32 and is connected at the first end 61 thereof in a rotationally fixed manner to the first gear shaft 32 via the coupling 63. As a result, the drive shaft 60 directly drives the first gearwheel 31, which transmits the movement to the second gearwheel 41, which in turn is arranged on the second gear shaft 42 in a rotationally fixed manner. The rotational movement is transmitted from the second gear shaft 42 to the second drive shaft 80 via the coupling 84.

Figure 6A:
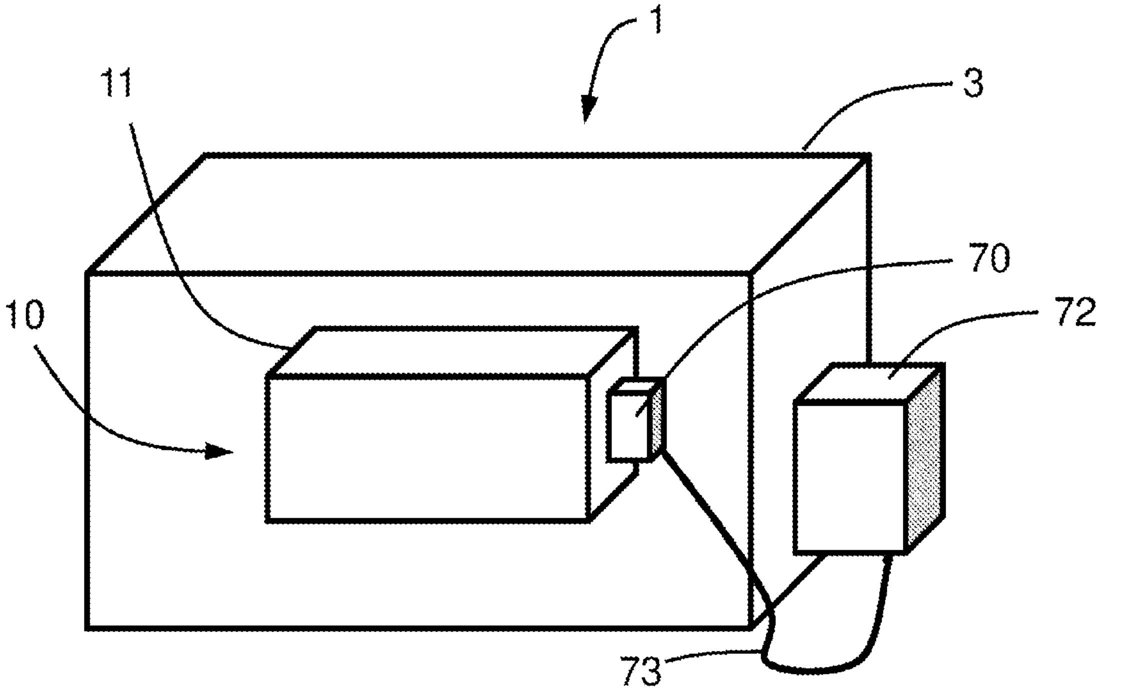
FIG. 6A is a schematic view of a tap-changing transformer with an exemplary embodiment of an on-load tap changer according to the improved concept.

FIG. 6A is a schematic view of a tap-changing transformer 1 with an exemplary embodiment of an on-load tap changer 10 according to the improved concept. According to this embodiment, the on-load tap changer 10 is in the form of a bolt-on tap changer which is accommodated in a housing 11 and is arranged on the outside of a transformer housing 3. The motor drive 70 is mounted on the side of the housing 11 of the on-load tap changer 10. The associated control cabinet 72 is attached to the transformer housing 3 and connected to the motor drive 70 via a cable 73.

Figure 6B:
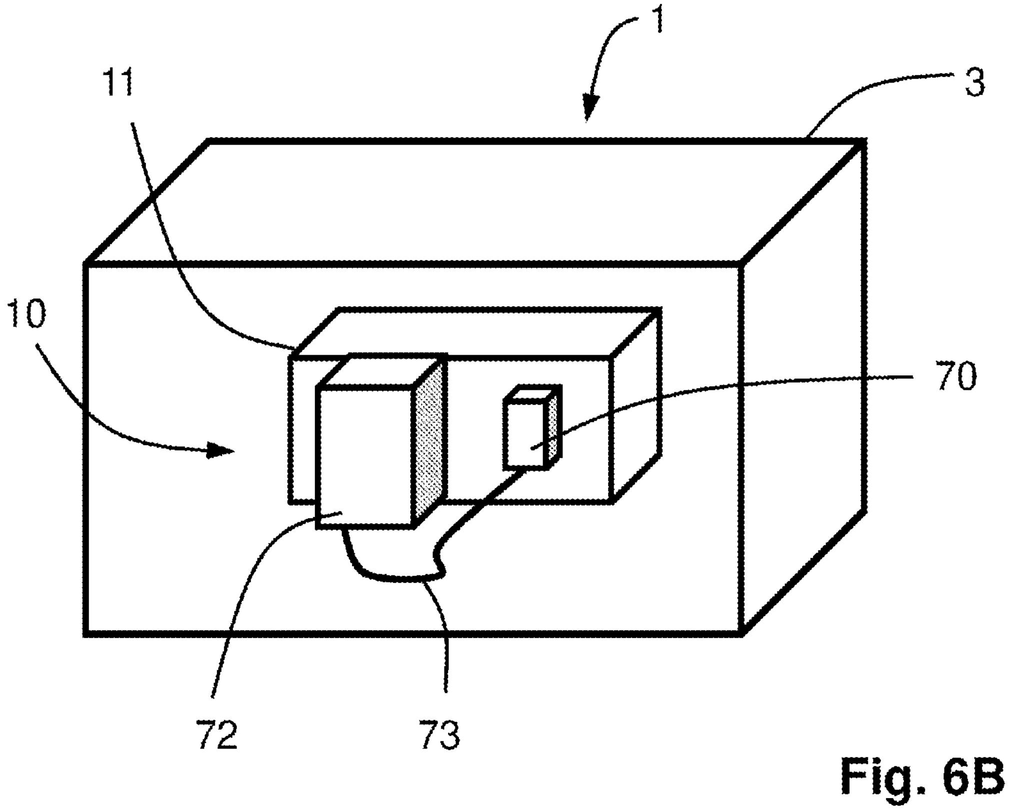
FIG. 6B is another schematic view of a tap-changing transformer with an exemplary embodiment of an on-load tap changer according to the improved concept.

FIG. 6B is another schematic view of a tap-changing transformer 1 with an exemplary embodiment of an on-load tap changer 10 according to the improved concept. According to this embodiment, the motor drive 70 is mounted on the end face of the housing 11 of the on-load tap changer 10. The associated control cabinet 72 is likewise arranged on the end face of the housing 11 of the on-load tap changer 10 and connected to the motor drive 70 via a cable 73.

However, the arrangement of the control cabinet 72 is not limited to the embodiments shown. As a result of the flexible cable connection within a defined distance from the on-load tap changer 10, which is dependent for example on the cable length and/or the drive solution, the control cabinet 72 can in principle be fixed anywhere at the operation site of the transformer, for example to a nearby wall.

By means of an on-load tap changer 10 according to the improved concept, it is possible to react in a flexible manner to different spatial conditions during transportation to or directly at the operation site. The motor drive can be attached in a variable manner to the end face or side of the housing of the on-load tap changer. The control cabinet can likewise be arranged in a variable manner and separately from the motor drive and the on-load tap changer. This is advantageous for example when replacing an old on-load tap changer with a new one, since in some circumstances, there is only a limited amount of space available for attaching the new on-load tap changer to the transformer housing, for example the space that was previously occupied by the old on-load tap changer. The improved concept is further advantageous for example when transporting the transformer with the on-load tap changer. Especially in the case of bolt-on tap changers, in this case, additional space is taken up by the on-load tap changer with the accompanying motor drive and control cabinet. By means of the improved concept, it is possible to make optimum use of the space which is available for example on a train car or in a truck and to transport the on-load tap changer with the transformer in a space-efficient manner. In addition, the accompanying control cabinet according to the improved concept can also be transported separately and only mounted in a suitable location at the operation site afterwards (see FIGS. 6A and 6B) so that in this case as well, it is possible to react to different spatial conditions during transportation and at the operation site in a flexible manner.

It is assumed that the present disclosure and many of the attendant advantages thereof can be understood from the above description. Furthermore, it is clear that various changes can be made to the shape, construction and arrangement of the components without departing from the disclosed subject matter or without sacrificing all material advantages. The embodiment described is merely explanatory and such changes are intended to be covered by the following claims. Furthermore, it is understood that the invention is defined by the following claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 tap-changing transformer
2 control winding of 1
3 transformer housing
10 on-load tap-changer
11 housing
30 selector unit
31 first gearwheel
32 first gear shaft
33 first gear axis
34 driver of 30
40 diverter switch unit

41 second gearwheel
42 second gear shaft
43 second gear axis
44 cam discs/actuation means of 40
50 toothed gearing
60 drive shaft
61 first end of 60
62 second end of 60
63 coupling at the first end 61
64 coupling at the first end 62
70 motor drive
71 transmission module
72 control cabinet
73 cable
80 second drive shaft
81 second selector unit
82 second diverter switch unit
83 second toothed gearing
84 coupling
90 third drive shaft
91 third selector unit
92 third diverter switch unit
93 third toothed gearing
α axis
$N_1, \ldots N_J, \ldots N_N$ winding taps of 1

The invention claimed is:

1. An on-load tap changer for uninterrupted switching between winding taps of a tap-changing transformer, the on-load tap changer comprising:

at least one selector configured to preselect, in a powerless manner, a selected winding tap of the winding taps;

at least one diverter switch configured to actually switch loads from a previous winding tap to a preselected winding tap of the winding taps;

at least one toothed gearing comprising a first gearwheel and a second gearwheel, the first gearwheel configured to drive the selector, and the second gearwheel configured to drive the diverter switch;

a drive shaft; and a motor drive configured to drive the drive shaft, wherein the first gearwheel and the second gearwheel are directly interconnected mechanically in such a way that the first gearwheel and the second gearwheel are simultaneously actuatable, wherein the first gearwheel is configured to be directly driven by the drive shaft, wherein the second gearwheel is configured to be directly driven by the drive shaft, and wherein the drive shaft is configured to selectively drive either the first gearwheel or the second gearwheel.

2. The on-load tap changer according to claim 1, wherein the at least one selector, the at least one diverter switch, the at least one toothed gearing, and the drive shaft are arranged in a housing of the on-load tap changer.

3. The on-load tap changer according to claim 1, wherein the first gearwheel is mounted in a rotationally fixed manner on a first gear shaft, and the second gearwheel is mounted in a rotationally fixed manner on a second gear shaft.

4. The on-load tap changer according to claim 3, wherein:

the first gear shaft is rotatable about a first gear axis, and the second gear shaft is rotatable about a second gear axis, and the first gear axis and the second gear axis intersect at a defined angle.

5. The on-load tap changer according to claim 1, wherein the first gearwheel and the second gearwheel are in the form of bevel gearwheels.

6. The on-load tap changer according to claim 3, wherein the drive shaft is configured to be connected in a rotationally fixed manner either to the first gear shaft or to the second gear shaft via a coupling.

7. The on-load tap changer according to claim 4, wherein the drive shaft is arranged on the first gear axis when driving the first gearwheel, and on the second gear axis when driving the second gearwheel.

8. The on-load tap changer according to claim 1, wherein the motor drive can be fixed to the housing of the on-load tap changer by means of a transmission module.

9. The on-load tap changer according to claim 1 , further comprising a control cabinet which is formed separately from the motor drive.

10. The on-load tap changer according to claim 1, comprising:

a second selector and a third selector;

a second diverter switch and a third diverter switch;

a second drive shaft and a third drive shaft; and a second toothed gearing and a third toothed gearing, wherein:

the second drive shaft is configured to actuate the second selector and the second diverter switch via the second toothed gearing, and the third drive shaft is configured to actuate the third selector and the third diverter switch via the third toothed gearing.

11. The on-load tap changer according to claim 10, wherein:

the drive shaft, the second drive shaft, and the third drive shaft, are mechanically coupled to one another in such a way that the drive shaft drives the second drive shaft via the toothed gearing, and the second drive shaft drives the third drive shaft via the second toothed gearing.

12. The on-load tap changer according to claim 10, wherein:

the second drive shaft and the third drive shaft are located on a common axis.

* * * * *